United States Patent [19]
Behm et al.

[11] Patent Number: 5,414,845
[45] Date of Patent: May 9, 1995

[54] NETWORK-BASED COMPUTER SYSTEM WITH IMPROVED NETWORK SCHEDULING SYSTEM

[75] Inventors: Jason L. Behm; Govind Balakrishnan; Daniel G. Eisenhauer, all of Kingston, N.Y.

[73] Assignee: International Business Machines Corporation, Armonk, N.Y.

[21] Appl. No.: 904,760

[22] Filed: Jun. 26, 1992

[51] Int. Cl.$^6$ .............................................. G06F 15/163
[52] U.S. Cl. ............................. 395/650; 364/DIG. 1; 364/281.8; 364/284.4
[58] Field of Search .................. 395/650, 700; 364/DIG. 1 MS File

[56] References Cited

U.S. PATENT DOCUMENTS

| | | | |
|---|---|---|---|
| 4,727,487 | 2/1988 | Masui et al. | 364/DIG. 1 |
| 4,747,130 | 5/1988 | Ho | 379/269 |
| 4,800,488 | 1/1989 | Agrawal et al. | 364/DIG. 1 |
| 4,827,411 | 5/1989 | Arrowood et al. | 364/DIG. 1 |
| 4,835,673 | 5/1989 | Rushby et al. | 364/DIG. 1 |
| 4,835,674 | 5/1989 | Collins et al. | 364/DIG. 1 |
| 4,890,227 | 12/1989 | Watanabe et al. | 364/DIG. 1 |
| 4,914,571 | 4/1990 | Baratz et al. | 364/DIG. 1 |
| 4,914,583 | 4/1990 | Weisshaar et al. | 364/DIG. 1 |
| 5,043,881 | 8/1991 | Hamazaki | 364/DIG. 1 |

OTHER PUBLICATIONS

Silverman et al., "A Distributed Batching System for Parallel Processing", *Software–Practice and Experience*, vol. 19, No. 12, Dec. 1989, pp. 1163–1174.

Litkow et al., "Condor-A Hunter of Idle Workstations", *Proc. 8th International Conference on Distributed Computing Systems*, IEEE, 1988, pp. 104–111.

Goscinski et al., "Resource Management in Large Distributed Systems" *Operating Systems Review*, vol. 24, No. 4, Oct. 1990, pp. 7–25.

Theimer et al., "Finding Idle Machines in a Workstation-Based Distributed System", *IEEE Transactions on Software Engineering*, vol. 15, No. 11, Nov. 1989, pp. 1444–1458.

Wang et al., "Load Sharing in Distributed Systems", *IEEE Transactions on Computers*, vol. C-34, No. 3, Mar. 1985, pp. 204–217.

Eager et al., "A Comparison of Receiver-Initiated and Sender-Initiated Adaptive Load Sharing", *Performance Evaluation*, 1986, pp. 53–68.

*Primary Examiner*—Thomas M. Heckler
*Attorney, Agent, or Firm*—Floyd A. Gonzalez; James E. Murray

[57] ABSTRACT

An improved resource management system for a network-based computer system is described. The computer system includes a plurality of processors interconnected by a network where some of the processors are user nodes and others are batch nodes. The management system includes a delivery system for receiving the requests from the user nodes and a separate scheduler system for scheduling which request Go process next and on which batch node.

12 Claims, 6 Drawing Sheets

NETWORK-BASED COMPUTER SYSTEM WITH IMPROVED NETWORK SCHEDULING SYSTEM

This invention relates to Local Area Network (LAN) or Wide Area Network (WAN) systems, and more particularly to a resource management subsystem for said LAN/WAN systems.

BACKGROUND OF THE INVENTION

A collection of autonomous machines connected by a network and unified by appropriate software and management policies is itself a computer system. This concept of a network-based computer system is emerging as a significant paradigm in the computer industry. Network-based computers include more than a client-server computing and its emphasis on a two party relationship. In network-based computing, a service (or resource) becomes a more general concept and no longer needs to be tied to a single machine; rather, it becomes a feature of the whole network-based computer. A network-based computer, or environment, can arise in a number of contexts such as in a heterogeneous collection of user workstations and server machines on a local area network; in a special purpose "clustered" machine consisting of individual processors connected by a high-speed network; or in a campus or enterprise or global network connecting several such environments together.

An important component in all of these environments is a resource management system. Such a system should have the capability of locating, allocating and delivering resources or services while respecting policy requirements for load-balancing, fair-share scheduling, and optimal usage of resources. The facilities of traditional client-server computing allow a client to lookup a service and contact a particular server, They do not specify the policies or mechanism needed to effectively allocate services to clients or to arbitrate between clients requesting services. Furthermore, they do not include the notion of a service provided by a collection of machines. What is missing is a scheduling capability and a better means for describing resources.

Much of the work on global scheduling and load balancing (or load sharing) is theoretical in nature. See, for example, the article entitled "A comparison of Receiver-Initiated and Sender-Initiated Adaptive Load Sharing" by Eager et al. in *Performance Evaluation*, 1986, pp. 53–68. Also see article entitled "Load Sharing in Distributed Systems," by Wang et al. in *IEEE Transactions on Computers*, Vol C-34, No. 3, March 1985, pp. 204–217. An article entitled "Finding Idle Machines in a Workstation-Based Distributed System" by Theimer et al., *IEEE Transactions on Software Engineering*, Vol. 15, No. 11, Nov. 1989, pp. 1444–1458 compares centralized and decentralized scheduling. There are papers describing experiences describing such systems as, for example, the following:

Goscinski et al., "Resource Management in Large Distributed Systems," *Operating Systems Review*, Vol. 24, No. 4, Oct. 1990, pp. 7–25.

Litkow et al., "Condor-A Hunter of Idle Workstations," in *Proc. 8th International Conference on Distributed Computing Systems*, IEEE, 1988, pp. 104–111.

Silverman et al., "A Distributed Batching System for Parallel Processing", *Software-Practice and Experience*, Vol. 19, No. 12, Dec. 1989, pp. 1163–1174.

Commercial implementations are also becoming available. Some of these include NQS/Exec from The Cummings Group, VXM's Balans, IDS's Resource Manager, and HP's Task Broker. These approaches solve similar problems and choose either a centralized or a decentralized approach. Many of the central-based approaches, other than IDS's Resource Manager which sits on top of ISIS, do not provide fault-tolerance. The system referenced above as Goscinski discusses scalability issues and overall architectural questions, including how a hierarchy of scheduling domains might be constructed. The Goscinski system uses decentralized scheduling in the local domain despite agreeing that a centralized approach will scale better.

U.S. Pat. No. 4,827,411 of Arrowood et al. illustrates a network resource management system in which each node maintains a copy of the network topology database defining network resources. U.S. Pat. No. 4,747,130 of Ho discloses a distributed processing system which utilizes a local resource database at each processor which contains data about the availability of system resources. U.S. Pat. No. 4,800,488 of Agrawal et al. illustrates a computer with a resource availability database that is not centralized. U.S. Pat. No. 4,835,673 of Rushby et al. describes a local area network system with an administrator which allocates or deallocates resources. This system broadcasts availability and is not centralized. U.S. Pat. No 4,890,227 of Watanabe et al. describes a resource management system which allocates resources using data stored in acknowledge database. U.S. Pat. No. 4,727,487 of Masui et al. illustrates a resource allocation in a computer system which resource management function includes a policy making function. U.S. Pat. No. 4,914,571 of Baratz et al. describes a system which locates resources in a network.

SUMMARY OF THE INVENTION

In accordance with the present invention an improved resource management system is provided by a common functionally separate scheduler to which the delivery system sends requests. The scheduler further has an independent policy module to which it consults. In contrast, the prior art schedulers were not functionally independent of the delivery and policy and there would be a scheduler at each delivery. There could also be a multiple delivery with scheduler at a given node. The scheduler in a delivery would also be dependent on how things get place to place.

One embodiment of the present invention is a network-based computer system with multiple processors each of which may act as a user and/or batch execution node and which has improved job/task scheduling provided by a delivery system, resource management system, and a common scheduler. The delivery system receives jobs from the user nodes and requests that they be scheduled by the functionally separate scheduler. In response, the scheduler uses the stored resource data and consults a policy algorithm. The policy algorithm indicates which job should be scheduled next (if any) and to which batch node it should be moved. The scheduler then passes this information back to the delivery system which moves the specified job to the specified batch node and begins its execution there.

DESCRIPTION OF ONE EMBODIMENT OF THE PRESENT INVENTION

Figure 1:
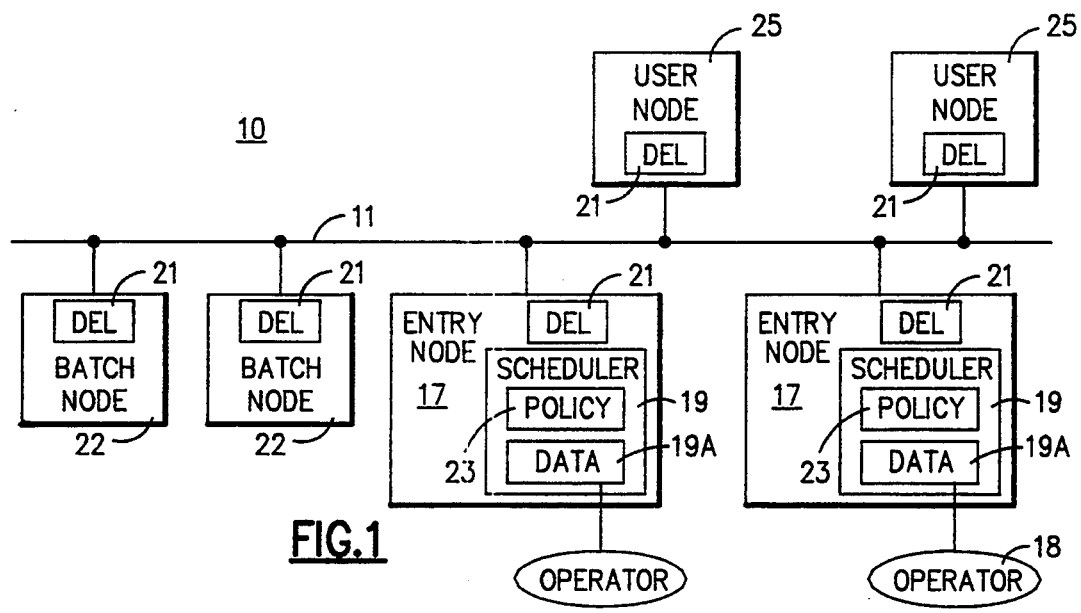
FIG. 1 illustrates a logical diagram of a Distributed Processor System with a network scheduling system according to one embodiment of the present invention with an Ethernet LAN network.

Referring to the distributed processor system 10 of FIG. 1 there is illustrated a LAN network which is shown in an Ethernet type of arrangement. Connected to the Ethernet 11 are the batch nodes 22, the entry nodes 17, and the user nodes 25. User nodes 25 submit jobs to the entry nodes via the delivery system 21. The delivery system on entry nodes 17 holds queued jobs awaiting scheduling, and routes scheduled jobs to their assigned batch node. The scheduler 19 and its associated policy module 23 run on the entry nodes, scheduling jobs and maintaining information. Batch nodes 22 receive and execute jobs via the delivery system. Any workstation or processor can be any combination of user, entry, or batch nodes simultaneously but these are architecturally and functionally different. Hence, physically, a workstation can be a user workstation as well as a batch processor or an entry node. In the network scheduling system, in accordance with the present invention, the scheduler 19, delivery system 21 and policy module 23 are separate logical components.

Figure 2:
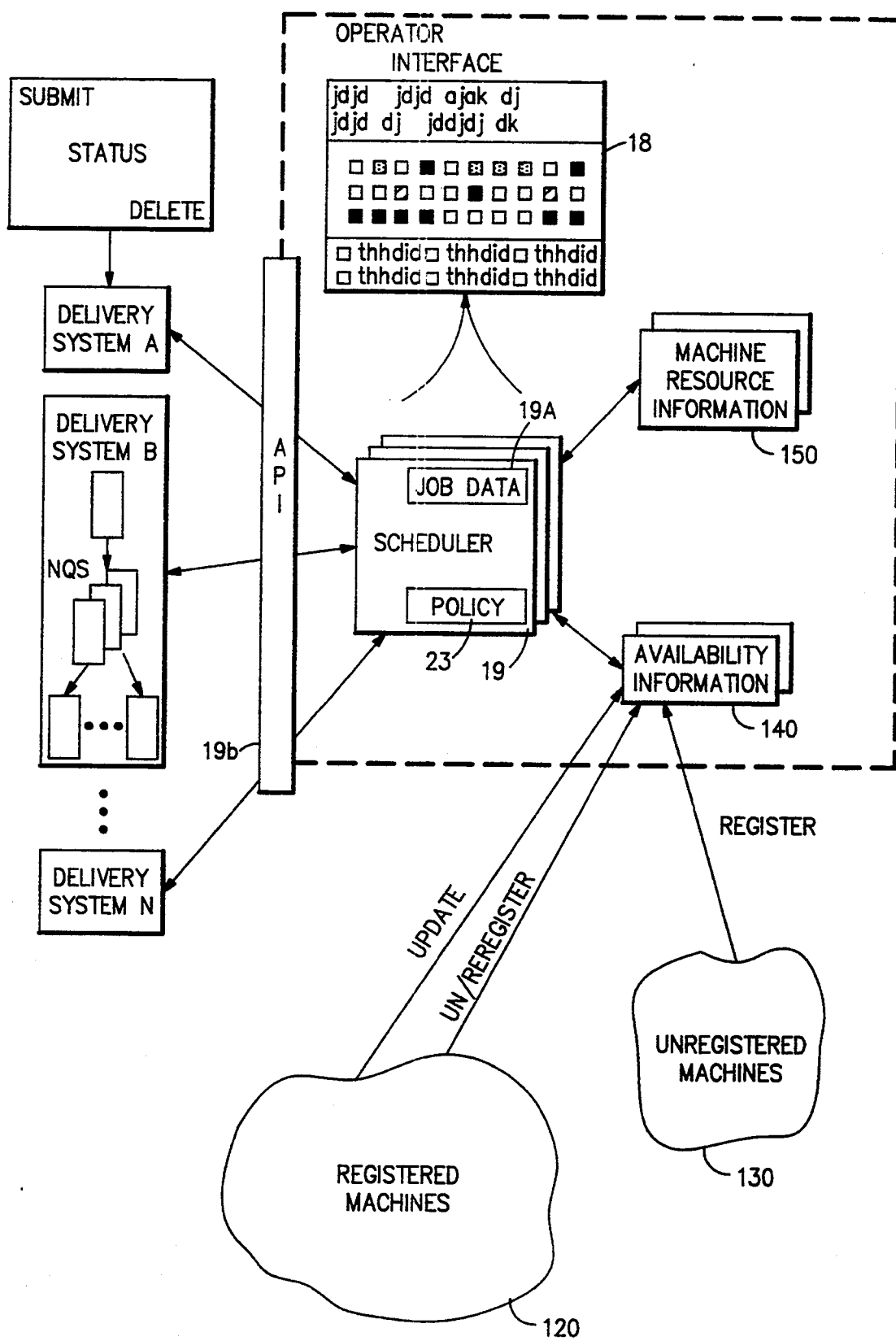
FIG. 2 is a functional diagram of the system of FIG. 1.

Referring to FIGS. 1 and 2, the system for scheduling computer tasks and jobs across a distributed network of computers further includes an operator interface 18 and an Application Program Interface (API) 19b.

The scheduler 19 is the centerpiece of the system. Given a list of jobs to run and a list of batch computer nodes to run the jobs on, it is the function of the scheduler 19 to consult the policy modules 23 to determine which job (if any) should be scheduled next and on which node it should be run. In this way, the scheduler 19 collects all information in storage or a database 19a and coordinates all scheduling activity. In addition, the scheduler 19 responds to queries for status information. This information is stored in its database. The scheduler 19 is event-driven as opposed to a polling type of system. The scheduler responds to external events such as a new job entering the system, a job starting or ending on a node, the availability of a node changing, or an operator action through an operator interface 18. The operator interface 18 is a graphical display of the database 19a. The scheduling system 19 consists of several identical processes which execute on separate entry nodes and which are synchronized by a fault tolerant messaging system (such as ISIS). The oldest scheduler process is the master scheduler and is responsible for consulting the policy regarding scheduling decisions, and then sharing the results with the other backup scheduler processes. If the master scheduler crashes or is otherwise terminated, the next oldest scheduler becomes the master scheduler. If the last scheduler crashes, no new scheduling occurs until another scheduler is added and started, but the jobs which were already scheduled will be moved to their destinations and begin execution. Each scheduler has it's own storage or database and is coupled to it's own policy module 23. Each scheduler may display an operator interface 18.

The policy module 23 contains a set of routines that are linked into the scheduling system. The scheduler calls specific policy routines corresponding to various events occurring in the system. The policy module for the master scheduler is also given the responsibility of selecting the next job to run. This policy module 23 is called when the master scheduler is prepared to schedule a job. The policy module is an architecturally distinct component of the system. The scheduler 19 and the policy module are designed such that new policy modules can be written and replaced in a running system. Each scheduler 19 has its own policy module and again the other policy modules are backups.

A batch node 22 runs the jobs and once a batch node registers with the system it is considered part of the registered pool 120. The batch nodes send a message to the scheduler 19 to register and then that node is placed in the database as a registered node with its characteristics. All nodes which are not of the registered machine pool are considered part of the unregistered machine pool 130. Machines periodically renew their registrations. If a machine fails to renew within a specified period of time (e.g., 2 registration periods), it is removed from the registered pool and considered part of the unregistered pool. At any given point, a registered machine is either available or unavailable for subsequent scheduling of additional jobs. Availability is determined by the local machine which may be given hints provided by the scheduler 19. This availability is collected in a machine availability section 140 of the scheduler's database to be accessed by the scheduler and its policy module. That availability is made known by messages sent by the nodes via the network to the scheduler. Like the scheduler itself, this system is implemented using a fault tolerant messaging system such as ISIS.

A resource is defined as anything which varies from one batch node to the next. Thus, if all nodes have 128MB of memory, then memory is not a resource. Each machine may have static resource information which may be needed in order to perform scheduling operations. This information is collected by a subsystem 150 and made available to the scheduler. Like the scheduler, this subsystem is implemented using a fault tolerant messaging system such as ISIS. Note that the differences between nodes is not limited to hardware differences. For example, a particular software package (such as Gaussian 88 which is a product and trademark of Gaussian ) may be installed on only some of the nodes, If a user needs to run this software, he can limit his job to only those nodes by requesting the resource named "gaussian". The current implementation uses resource lists which allow the system administrator to define resources by assigning a resource name to a list of nodes having that resource.

In the current system, the Network Queuing System (NQS) is used as a delivery system. Jobs submitted by NQS are submitted on a user node and from there are sent to one of a set of entry nodes. The job is received into an entry queue. The NQS pipeclient for that queue informs the scheduler of the new job and then transfers the job to a hold queue where tile job remains until a scheduling decision is made by the scheduler 19. When the scheduler makes its decision, it sends a message to NQS informing it of that decision. From there, NQS transfers the job from the hold queue to the active queue. The NQS pipeclient for the active queue routes the job to its final destination on a batch node. The standard version of NQS was modified to consult the scheduler, to wait for and act on its decision, and to inform the scheduler of the job's successful or unsuccessful initiation and completion. Standard NQS can only either run a job locally or transfer it to another machine; it does not have any advanced scheduling. All interaction with the scheduling system is done via the defined API. There are multiple delivery systems.

The user interacts with the system through a set of user commands. These include: Submit a job, Query the status of jobs, Delete a job, and Query the status of the cluster as a whole (number of jobs). The user interface is currently implemented through "line-mode" commands, but could be implemented as an XWindows Motif-based application. (The XWindows system is a trademark of Massachusetts Institute of Technology (M.I.T.) and Motif is a trademark of Open Software Foundation (OSF)). As discussed previously, the requests by the delivery system and user commands to the scheduler are handled through the scheduler Application Program Interface (API). The API is such that multiple delivery systems may simultaneously request scheduling services from the scheduler.

An XWindow Motif-based operator interface is provided and is a graphical representation of the scheduler's data. For each node in the system there is a button which is green if the node is available, grey if not available or red if there is a problem with the node. These colors are user changeable. In addition, for each job (up to five jobs) running on a node there is a little dot placed along the top of the node button (beginning from the left). The operator can see at a glance the current status of the system (eg. mostly available, or a problem exists somewhere). Information related to the system is also displayed, such as number of jobs, number of schedulers, host name of the scheduler which owns this instance of the operators interface display, and current "rank" (relative age) of this scheduler compared with all other schedulers in the system. The operator can move the mouse to a particular button (node) and "click" on it to display the status of that node. The operator can also display information about the jobs queued and/or executing by clicking on a "pull-down menu". The operator can also perform such functions as asking all nodes to re-register with the system, killing a single copy of the scheduler, or ignoring a node for scheduling.

Figure 3:
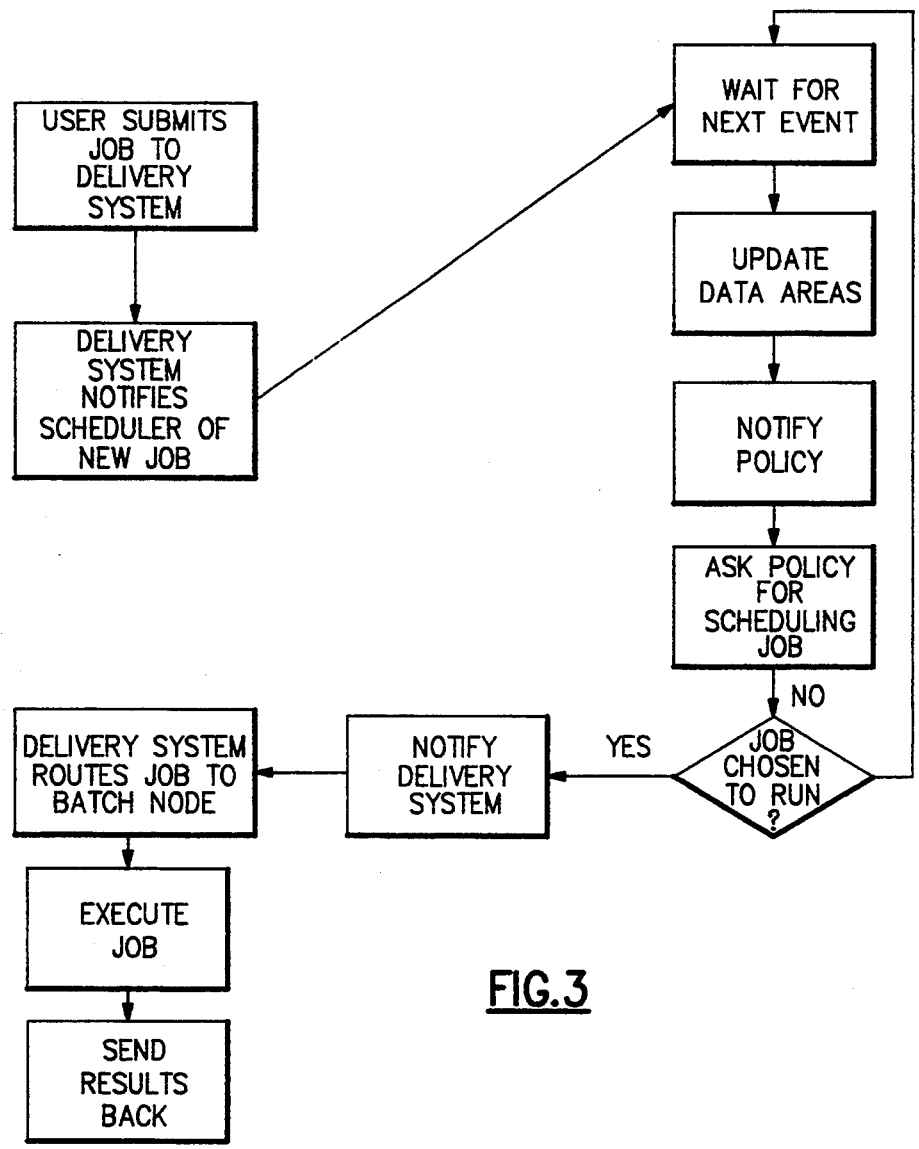
FIG. 3 is a flow chart for the system of FIGS. 1 and 2.

FIG. 3 is a flow diagram illustrating overall operation of the system as discussed above. A user submits a job to the delivery system on a user node. The scheduler is notified that the job has arrived and of the resources it requests. Upon receiving the notification, the scheduler stores pertinent information about the job into its database. The scheduler then notifies the policy module, and then consults the policy module to make a scheduling decision. If a job is chosen to run, the scheduling system notifies the delivery system which then routes the job to the batch node, executes the job, and sends the results back to the submitting node. If no job is chosen to run, the scheduler awaits future events.

Figure 4:
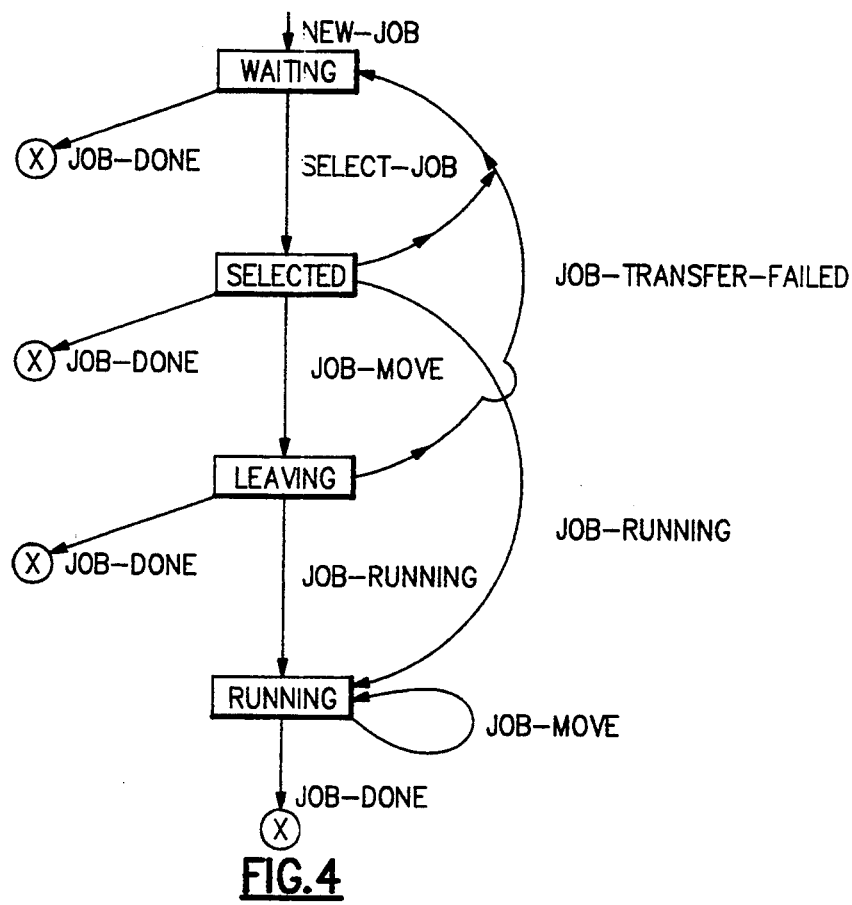
FIG. 4 is a flow chart illustrating the sequence of states for a job as messages are received.

Each scheduler process receives messages about jobs in the system, about nodes in the system, and about the system state (see FIG. 4). Schedulers also receive queries about the current state of the system. These messages are broadcasts sent by other components of the system to the schedulers or by one scheduler to all the schedulers. Each message received initiates a new thread within that scheduler.

Figure 5:
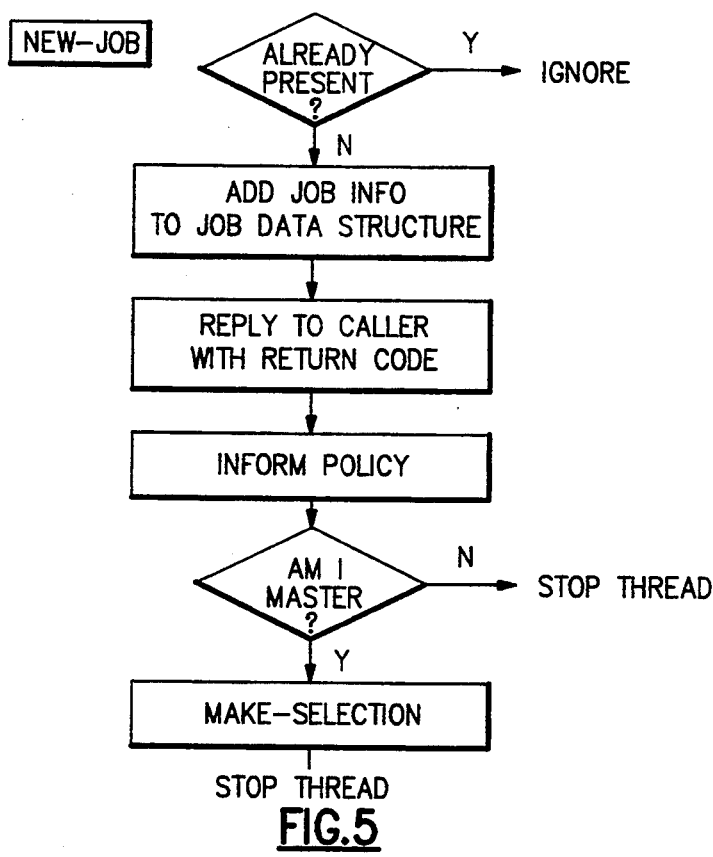
FIG. 5 illustrates the flow for a new job.
Figure 6:
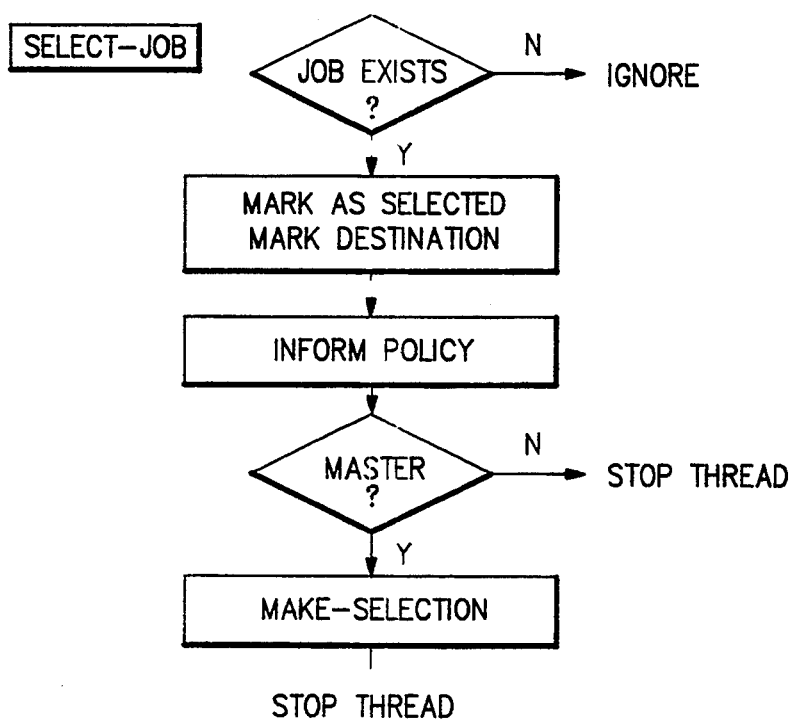
FIG. 6 illustrates the flow for a select job.
Figure 7:
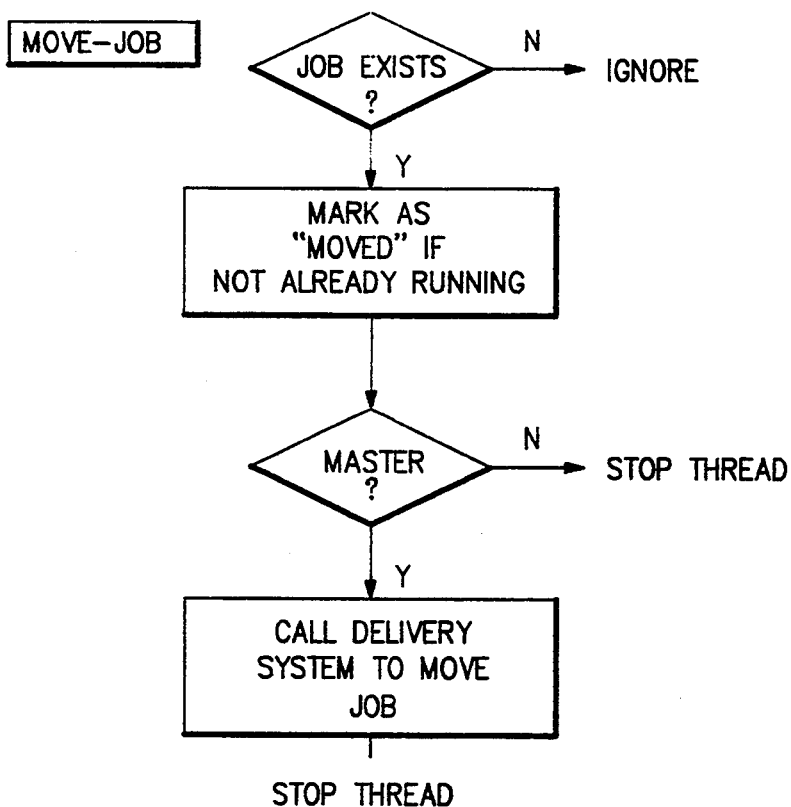
FIG. 7 illustrates the flow for a move job.
Figure 8:
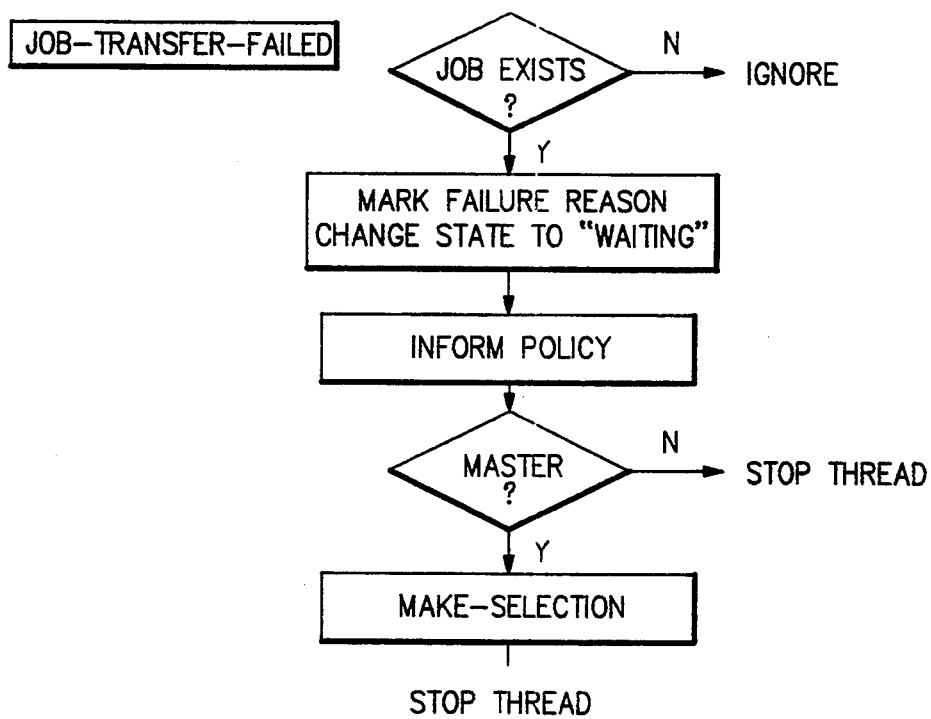
FIG. 8 illustrates the flow for a job-transfer-failed.
Figure 9:
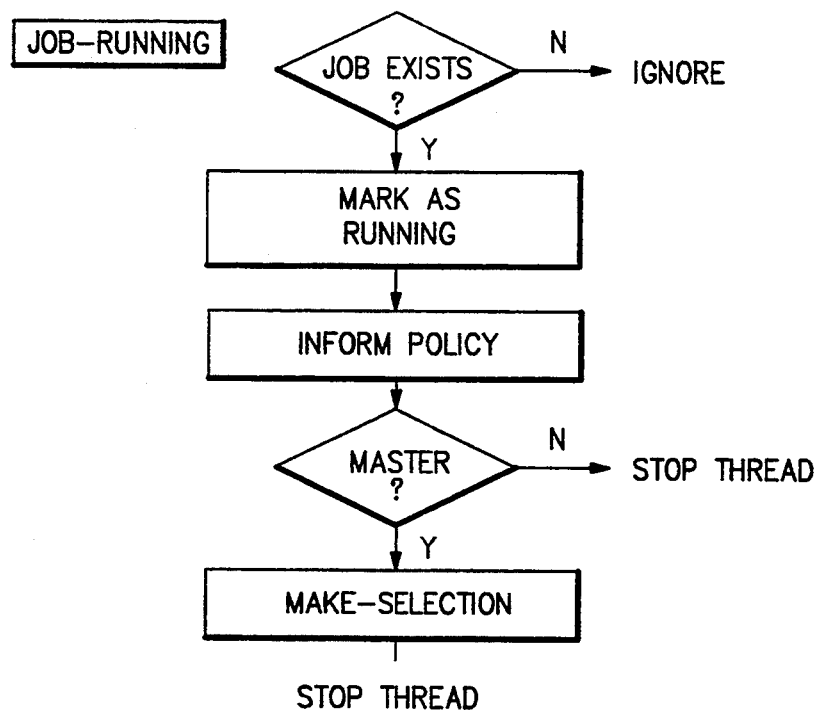
FIG. 9 illustrates the flow for a job running.
Figure 10:
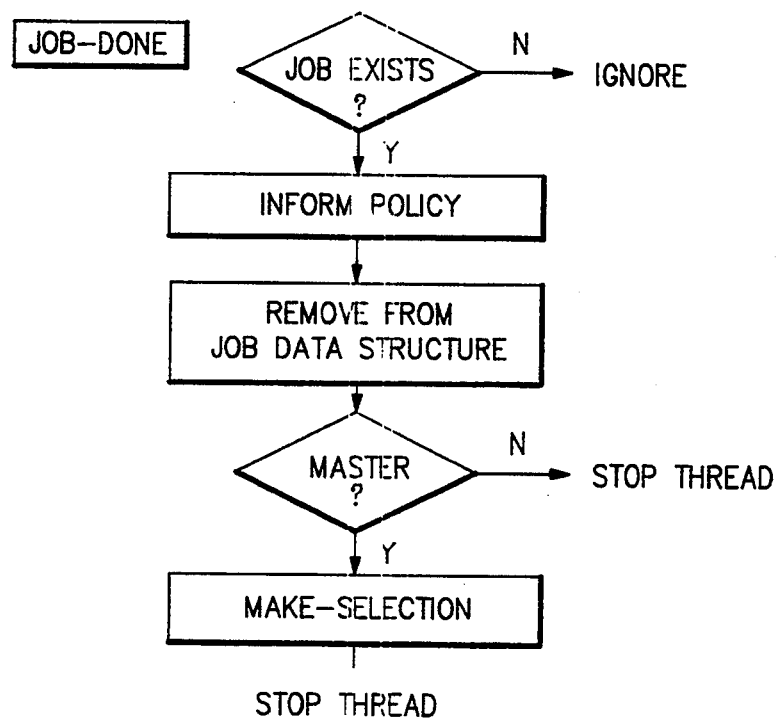
FIG. 10 illustrates the flow for a job done.
Figure 11:
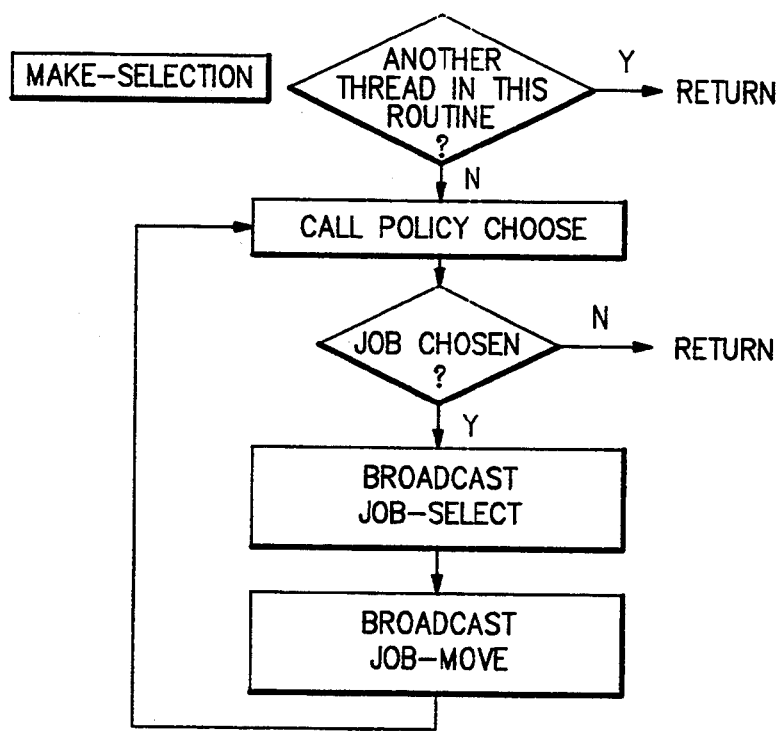
FIG. 11 illustrates the make selection process.

The following messages are processed by the schedulers regarding jobs:
* new_job: sent by delivery system to indicate a new job has been submitted (see FIG. 5);
* select_job: sent by master scheduler to indicate that it has selected a particular job for execution (see FIG. 6);
* move_job: sent by master scheduler to indicate that a previously selected job should be moved to its selected destination (see FIG. 7);
* job_transfer_failed: sent by delivery system to indicate that a previously selected job could not get to its destination (see FIG. 8);
* job_running: sent by delivery system to indicate that a previously selected job has successfully started execution on its destination (see FIG. 9);
* job_done: sent by delivery system to indicate that a job has finished (see FIG. 10).

Each message is processed independently by each scheduler. The flowcharts of FIGS. 4-11 describe the behavior of an individual scheduler upon receipt of a job related message.

The following messages are processed by the schedulers regarding nodes:
* node_register: sent by node to register with the scheduling system;
* node_unregister: sent by node to unregister from the scheduling system;
* node_update: sent by node to indicate its availability for running jobs;
* ignore_node: sent by one scheduler to indicate that a given node should be ignored for scheduling purposes.
* unignore_node: sent by one scheduler to indicate that a given node should
no longer be ignored for scheduling purposes.

For each such message the scheduler updates its node data structures and then calls a policy exit informing the policy of the event.

The following messages are processed by the schedulers regarding system state:
* group_change: a scheduler has started or ended;
* new_master: a new master scheduler has started.

While the invention has been particularly shown and described with reference to preferred embodiments thereof, it will be understood by those skilled in the art that various changes in form and details may be made therein without departing from the spirit and scope of the invention.

What is claimed is:
1. A network-based computer system comprising:
a network,
a plurality of processors coupled to said network and thereby to each other with some of said processors operating as user nodes for sending jobs to be run at batch nodes and some of said processors being the batch nodes and some being both batch and user nodes,
a resource management system for said computer system coupled to said network, said resource management system comprising:

a common scheduler for the computer system scheduling all jobs from user nodes to said batch nodes, said common scheduler including a policy module, said policy module for setting scheduling policy for said common scheduler for deciding the routing of jobs to batch nodes independently of the operation of said common scheduler so that said policy module can be replaced while the computer system is in operation to change said scheduling policy;

a delivery system responsive to jobs from said user nodes for sending scheduling requests to said common scheduler and in response to the decision of the scheduler, routing each job to one of said batch nodes said delivery system and said common scheduler being independent entities so that job delivery is separate from job scheduling, and said common scheduler having a database storing job status and node availability information to run a job at a batch node, said common scheduler being responsive to said scheduling requests made through an application programming interface (API) from said delivery system and policy from said policy module for determining which job is scheduled next and on which node it is run.

2. The computer system of claim 1 wherein said common scheduler includes a master scheduler and at least one duplicate or spare scheduler for backing up said master scheduler, said spare scheduler maintaining a full copy of what is stored in said master scheduler for replacement of said master scheduler if said master scheduler is unavailable.

3. The computer system of claim 2 wherein said master and spare schedulers each have their own database and include their own policy module.

4. The computer system of claim 1 wherein said scheduler is responsive to a new job entering the system, a job starting or ending on a node, the availability of a node changing significantly or an operator action to alter the job which is scheduled next and on which batch processing node.

5. The computer system of claim 1 wherein said scheduler calls up said policy module each time a new job is received.

6. A resource management system for use in a computer system comprising a network, a plurality of processors coupled to said network and thereby to each other where some of said processors are user nodes for sending jobs and some are batch processors and some are both user nodes and batch processors to which jobs are sent, said resource management system comprising:

a common scheduler handling all requests from all user nodes in the system, said scheduler including a separate operationally independent policy module for setting forth rules for said scheduler so that the policy module can be replaced in a running system, a delivery system responsive to jobs from said user nodes for sending scheduling requests to said common scheduler and in response to a routing message from said scheduler routing the job to the indicated batch processor, said delivery system being an independent entity from said scheduler so that job delivery is separate from job scheduling, said scheduler having a database storing job status and node availability information to run a job at a batch node, said scheduling being responsive to said scheduling requests from said delivery system and policy from said policy module for determining which job is scheduled next and by which node and sending said routing message to said delivery system.

7. The computer system of claim 6 wherein said scheduler includes a master scheduler and at least one duplicate or spare scheduler for backing up said master scheduler if it should fail and having a full copy of what is stored in said master scheduler.

8. The computer system of claim 7 wherein said master scheduler and spare schedulers each have their own database and include their own policy module.

9. The computer system of claim 6 wherein said scheduler is responsive to a new job entering the system, a job starting or ending on a node, the availability of a node changing significantly or an operator action to alter the job which is scheduled next and on which batch processing node.

10. The computer system of claim 6 wherein said scheduler calls up said policy module each time a new job is received.

11. A method of scheduling jobs between user nodes and batch nodes in a computer system comprising a network and plural processors coupled to said network with same processors being at user nodes and other processors being at batch nodes of said network, jobs in said network being sent from said user nodes by means of user node requests and routed to said batch nodes by scheduling requests in accordance with a policy, and each batch node having availability and job status information, said method comprising the steps of:

sending said user node requests from said user nodes to a delivery system, sending said scheduling requests from said delivery system to a common scheduler, said common scheduler operating independently of the delivery system and requesting access to a batch node in accordance with said policy, sending said availability information and said job status information from said batch nodes to said common scheduler, scheduling said jobs on said common scheduler based on said user node requests, said availability information, said job status information and said policy to provide which job is sent next and to what node, and delivering said jobs using the delivery system to the batch nodes based on said scheduling whereby delivery and scheduling are maintained independent of one another.

12. The method set forth in claim 11 including the step of selectively changing the setting of said policy for the common scheduler independent of the operation of said delivery system so that policy for the scheduler can be changed in an operating computer system.

* * * * *